(No Model.)

G. W. MILTIMORE.
CAR AXLE.

No. 264,188. Patented Sept. 12, 1882.

Attest:
Geo. H. Graham
A. N. Jasbera

Inventor,
George W. Miltimore,
by Munson & Philipp
Attys.

UNITED STATES PATENT OFFICE.

GEORGE W. MILTIMORE, OF CHICAGO, ILLINOIS, ASSIGNOR TO THE MILTIMORE CAR AXLE COMPANY, OF NEW YORK, N. Y.

CAR-AXLE.

SPECIFICATION forming part of Letters Patent No. 264,188, dated September 12, 1882.

Application filed February 3, 1882. (No model.)

*To all whom it may concern:*

Be it known that I, GEORGE W. MILTIMORE, a citizen of the United States, residing in the city of Chicago, county of Cook, and State of Illinois, have invented certain new and useful Improvements in Car-Axles, fully described and represented in the following specification and the accompanying drawings, forming a part of the same.

In cars for railways as formerly and almost universally constructed each axle was made in one piece and the wheels were secured rigidly thereto. Great wear and loss to the axle, its wheels, and the rails of the road resulted from this construction. This was caused by one wheel, in going around curves, traveling a greater distance than the other, which latter must slip, thus grinding and wearing itself and the rail away, and by retarding the free movement of the axle causing a torsional strain. This wear of the wheels and the rails, the destruction of the axle by torsional strain, and the waste of power are augmented when one wheel is of greater diameter than its companion on the same axle, as is often the case. Efforts have been made to overcome the great loss incident to this construction of axles and wheels by making them so that the latter may revolve independently of the former and of each other. In this latter construction it was found necessary to make the axle stationary. Many difficulties were met with when this was done, owing to the spring of the axle near its center, caused by the load of the car which was outside of the wheels, to the lateral motion or thrust of the axle, to the friction of the bearing-surfaces, their insufficient lubrication, and to the great weight of the axle and the various parts incident to constructions for overcoming these difficulties.

In United States Letters Patent No. 222,833, granted to me on December 23, 1879, there are shown and described a wheel and axle designed to obviate these difficulties, and it is to the wheel and axle there shown that the present invention relates, it being the object of the invention to effect certain improvements in the construction there shown which will render the wheel and axle more serviceable and lessen the cost of their production.

To that end the invention consists in certain details of construction and combinations of parts, all of which will be hereinafter fully explained and specifically pointed out.

Figure 1:
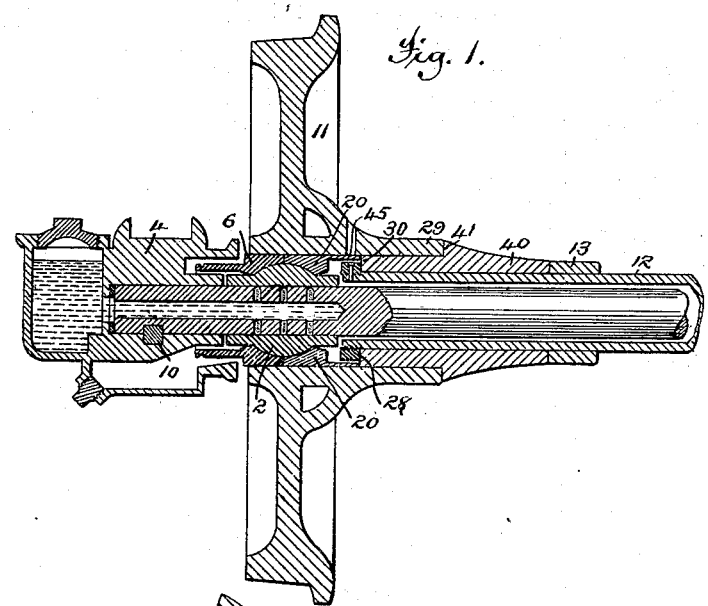
Figure 2:
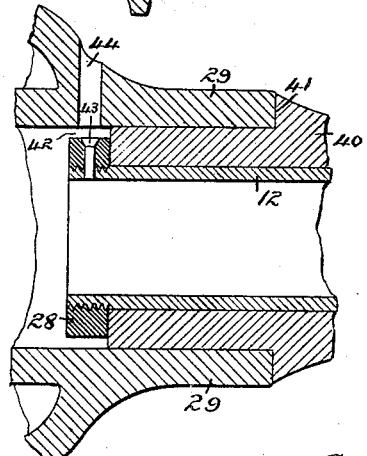

In said drawings, Figure 1 is a longitudinal vertical section of one wheel and a portion of an axle of the general construction shown in the patent referred to, but embodying the improvements constituting the present invention. Fig. 2 is an enlarged view of a portion of Fig. 1.

In general features of construction and operation the wheel and axle shown in the present application are the same as shown in the patent referred to, and consequently a very brief description of those features common to both will suffice.

Referring to the drawings, it will be seen that the ends of the axle 1 fit within the pedestal-supports 4, and are rigidly secured to the same by keys 10, fitting in grooves in the axle and pedestal-supports, as shown. On each end of the axle 1 is a box, 2, made convex about its middle, which convex portion is seated in a cavity having a corresponding concave portion in the wheel 11, and is caused to move with the latter by means of a pin (not shown) which locks the wheel and box together. The concave bearing for the box 2 is formed of the two collars 6 and 20, which are rigidly secured to the wheel in a manner fully set forth in the patent referred to. A tube, 12, having an interior diameter somewhat greater than the diameter of the axle, encircles the axle between the wheels, and its ends fit into sleeves extending from the inside of the wheels, thus supporting the wheels in an upright position whenever the weight of the load causes the axle to spring, all of which is fully set forth and explained in the patent referred to.

It was found in practice that the sleeve 29 of the wheel was subjected to very great strain, owing to the lateral pressure or thrust of the axle, and that this sleeve, in order to support the wheel in a perfectly perpendicular position at all times and not be liable to be broken by the strain, must extend a considerable distance from the wheel and onto the tube 12. It was also found to be very difficult, if not impossible, to cast the wheel and a sleeve of sufficient length in a single piece, because the peculiar shape of the structure and the disposition of the metal made the casting almost certain to crack in cooling. Another objection to the construction shown in the patent referred to was that in order to form the shoulders for the ring 28 and the box 20 to rest against it was necessary to make the opening through the wheel and sleeve of three different diameters in its different parts. This required the use of drills of three different sizes in boring the hole, required many stoppages and changes of the machinery, and made the construction of the wheel unnecessarily slow and expensive. Both of the before-mentioned difficulties are avoided by the present invention, in which the wheel 11 is formed with a comparatively short sleeve, 29, and in which the opening through the wheel and sleeve is of uniform size throughout its length. A supplemental sleeve, 40, having in the case shown an annular shoulder, 41, although such shoulder is not absolutely essential, is then by hydraulic or other pressure forced into the opening in sleeve 29 until the shoulder 41 is brought against the end of said sleeve. The sleeves 29 and 40 thus become rigidly secured to each other, and together form a bearing upon tube 12 of sufficient length to support the wheel and withstand all lateral strain or thrust. The tube 12 is provided with the collar 13, (the same as in the patent referred to,) against which the end of sleeve 40 abuts. The inner end of the sleeve 40 forms a shoulder, 30, against which the annular nut 28, when screwed onto the end of the tube 12, abuts, so as to prevent the wheel and tube from being drawn apart. In the patent referred to the annular nut 28 extends outward a distance equal to the full height of the shoulder 30; but in the present case this nut is of a less height, so that an annular opening, 42, for a purpose to be presently explained, is left between the nut and the interior of the sleeve 29. The nut 28, after being screwed onto the tube 12, is locked by the pin 43, which passes through registering openings in the nut and tube. This locking-pin, instead of being inserted from the interior of the tube 12 and bent over upon the outside of the nut, as in the patent referred to, is inserted from the outside of the nut and rests loosely in its seat, it being prevented from dropping through into the interior of the tube by a head upon its outer end, which rests in a countersink in the nut. In order to insert this locking-pin the sleeve 29 is provided with an opening, 44, through which it is dropped when the wheel has been turned so as to bring the openings into register. After the pin 43 has been inserted the collar 20 is placed in position, as shown in Fig. 1. This collar, unlike that shown in the patent referred to, is provided with an annular extension, 45, which enters the opening 42 and abuts against the shoulder 30 of the sleeve. The extension 45 serves the double purpose of keeping the box in its proper position and preventing the pin 43 from dropping from its seat when it is carried beneath the axle. By making this extension upon the collar 20 and causing it to abut against shoulder 30 one of the shoulders shown in my former patent is dispensed with and the construction of the wheel and axle is correspondingly simplified.

What I claim is—

1. The combination, with a stationary axle, of wheels provided with boxes bearing directly on said axle, and with sleeves and supplemental sleeves secured rigidly thereto, of a tube to keep said wheels apart and allow each to turn independently of the other, substantially as described.

2. A tube provided with collars, as 13 28, in combination with wheels provided with sleeves, as 29, and supplemental sleeves, as 40, substantially as described.

3. The combination, with the supplemental sleeve, as 40, of the collar, as 20, having the extension, as 45, substantially as described.

4. The combination of the nut or collar 28 and its locking-pin 43 with collar 20, having the extension 45, substantially as described.

In testimony whereof I have hereunto set my hand in the presence of two subscribing witnesses.

GEORGE W. MILTIMORE.

Witnesses:
JAMES K. BATCHELDER,
S. E. WRIGHT.